(12) United States Patent
Li et al.

(10) Patent No.: US 8,059,610 B2
(45) Date of Patent: Nov. 15, 2011

(54) METHOD AND APPARATUS FOR IMPLEMENTING H-ARQ IN A MIMO WIRELESS COMMUNICATION SYSTEM

(75) Inventors: Yingxue Li, Exton, PA (US); Sung-Hyuk Shin, Northvale, NJ (US); Guodong Zhang, Farmingdale, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 991 days.

(21) Appl. No.: 11/736,847

(22) Filed: Apr. 18, 2007

(65) Prior Publication Data

US 2007/0242773 A1     Oct. 18, 2007

Related U.S. Application Data

(60) Provisional application No. 60/792,765, filed on Apr. 18, 2006.

(51) Int. Cl.
*H04W 4/00* (2009.01)
(52) U.S. Cl. .................. 370/334; 455/13.3; 455/562.11
(58) Field of Classification Search .................. 370/310, 370/334, 339, 343; 455/13.3, 91, 101, 103, 455/129, 130, 132, 272, 279.1, 562.1; 375/299, 375/267, 347
See application file for complete search history.

(56) References Cited

U.S. PATENT DOCUMENTS

| | | | |
|---|---|---|---|
| 6,594,473 B1 | 7/2003 | Dabak et al. | |
| 7,447,968 B2 | 11/2008 | Ha et al. | |
| 2002/0172208 A1* | 11/2002 | Malkamaki | 370/400 |
| 2003/0012318 A1* | 1/2003 | Piirainen | 375/358 |
| 2003/0076870 A1* | 4/2003 | Moon et al. | 375/130 |
| 2004/0057530 A1* | 3/2004 | Tarokh et al. | 375/267 |
| 2004/0114549 A1* | 6/2004 | Miyoshi | 370/320 |
| 2005/0094603 A1* | 5/2005 | Kim et al. | 370/334 |
| 2005/0147177 A1* | 7/2005 | Seo et al. | 375/267 |
| 2005/0219999 A1* | 10/2005 | Kim et al. | 370/207 |
| 2006/0036922 A1* | 2/2006 | Hong et al. | 714/748 |
| 2006/0039299 A1* | 2/2006 | Ihm et al. | 370/254 |

(Continued)

FOREIGN PATENT DOCUMENTS

EP    0 736 979    10/1996

(Continued)

OTHER PUBLICATIONS

Wikipedia; Space-Time Block Code.*

(Continued)

*Primary Examiner* — Pao Sinkantarakorn
*Assistant Examiner* — Wei-po Kao
(74) *Attorney, Agent, or Firm* — Volpe and Koenig, P.C.

(57) ABSTRACT

A method and apparatus for implementing hybrid automatic repeat request (H-ARQ) in a multiple-input multiple-output (MIMO) wireless communication system are disclosed. A transmitter transmits at least two data packets via two or more antennas. If at least one of the data packets is not successfully transmitted, the transmitter retransmits the data packets while rearranging the data packets in an orthogonal spreading manner. Alternatively, the transmitter may retransmit only the unsuccessfully transmitted data packet along with a new data packet which replaces a successfully transmitted data packet. The unsuccessfully transmitted data packet may simply be repeated without changing its format. When only the unsuccessfully transmitted data packet is retransmitted along with the new data packet, the transmissions may be combined to recover the retransmitted data packet and the new data packet simultaneously.

16 Claims, 1 Drawing Sheet

U.S. PATENT DOCUMENTS

2006/0179390 A1* 8/2006 Tirkkonen et al. ............ 714/748
2007/0115864 A1* 5/2007 Bar-Ness et al. ............ 370/278

FOREIGN PATENT DOCUMENTS

| EP | 1 298 829 | 4/2002 |
|---|---|---|
| EP | 1 753 154 | 8/2006 |
| WO | 03/101029 | 12/2003 |
| WO | 05/057810 | 6/2005 |

OTHER PUBLICATIONS

3GPP, *3rd Generation Partnership Project; Technical Specification Group Radio Access Network; Physical Layer Aspects for Evolved UTRA (Release 7)*, 3GPP TR 25.814 V1.2.2 (Mar. 2006).

3GPP, *3rd Generation Partnership Project; Technical Specification Group Radio Access Network; Physical Layer Aspects for Evolved Universal Terrestrial Radio Access (UTRA) (Release 7)* 3GPP TR 25.814 V7.1.0 (Sep. 2006).

3GPP, *3rd Generation Partnership Project; Technical Specification Group Radio Access Network; Multiplexing and Channel Coding (FDD) (Release 6)*, 3GPP TS 25.212 V6.6.0 (Sep. 2005).

Nokia, *Method for Signal Constellation Rearrangement in Retransmissions*, TSG-RAN WG1 #21, R1-01-0831, (Turin, Italy Aug. 27-31, 2001).

Nortel, *QO-STFBC/Double-STTD Based H-ARQ for Four Transmit Antennas*, 3GPP TSG-RAN1 Ad Hoc, R1-060149, (Helsinki, Finland Jan. 23-25, 2006).

Nortel, *Space Time Block Coding Based H-ARQ*, 3GPP TSG-RAN1 Meeting #43, R1-051426, (Seoul, Korea Nov. 7-11, 2005).

Panasonic, *Enhanced HARQ Method With Signal Constellation Rearrangement*, TSG-RAN Working Group 1 Meeting #19, R1-01-0237, (Las Vegas, Feb. 27-Mar. 2, 2001).

Samra et al., *Symbol Mapping Diversity Design for Multiple Packet Transmissions*, IEEE Transactions on Communications, vol. 53, No. 5, pp. 810-817, (May 2005).

Acolatse et al., "An Alamouti-Based Hybrid ARQ Scheme for MIMO Systems," Proceedings of the 14th IST Mobile and Wireless Communications (Jun. 22, 2005).

* cited by examiner

METHOD AND APPARATUS FOR IMPLEMENTING H-ARQ IN A MIMO WIRELESS COMMUNICATION SYSTEM

CROSS REFERENCE TO RELATED APPLICATION

This application claims the benefit of U.S. Provisional Application No. 60/792,765 filed Apr. 18, 2006, which is incorporated by reference as if fully set forth.

FIELD OF INVENTION

The present invention is related to wireless communication systems. More particularly, the present invention is related to a method and apparatus for implementing hybrid automatic repeat request (H-ARQ) in a multiple-input multiple-output (MIMO) wireless communication system.

BACKGROUND

H-ARQ is a transmission scheme that is widely used in many wireless communication systems to ensure successful data transmission. In H-ARQ, a receiver sends feedback to a transmitter, indicating successful or unsuccessful receipt of a data packet, so that the transmitter retransmits a failed data packet.

MIMO is a technique used to increase data rate and system throughput. In a MIMO system, a transmitter and a receiver use multiple antennas for transmission and reception so that multiple data streams are transmitted simultaneously via multiple antennas.

Different H-ARQ transmission schemes have been proposed for MIMO systems. In a conventional simple repetitive H-ARQ scheme for a MIMO system, symbols are simply repeated in a subsequent transmission if the initial transmission fails. Table 1 shows signal transmissions in accordance with the conventional simple repetitive H-ARQ for a 2×2 MIMO system.

TABLE 1

|                     | Antenna 1 | Antenna 2 |
|---------------------|-----------|-----------|
| first transmission  | $x_1$     | $x_2$     |
| second transmission | $x_1$     | $x_2$     |

A space time block code (STBC)-based H-ARQ scheme for a MIMO system has been proposed for evolved universal terrestrial radio access (EUTRA). Table 2 shows signal transmissions in accordance with the STBC-based H-ARQ for a 2×2 MIMO system.

TABLE 2

|                     | Antenna 1 | Antenna 2 |
|---------------------|-----------|-----------|
| first transmission  | $x_1$     | $x_2$     |
| second transmission | $x_2^*$   | $-x_1^*$  |

In a 2×2 MIMO system, as an exemplary MIMO system, a received signal may be expressed as follows:

$$\begin{pmatrix} y_1(t) \\ y_2(t) \end{pmatrix} = \begin{pmatrix} h_{11}(t) & h_{12}(t) \\ h_{21}(t) & h_{22}(t) \end{pmatrix} \begin{pmatrix} x_1 \\ x_2 \end{pmatrix} + \begin{pmatrix} n_1(t) \\ n_2(t) \end{pmatrix}; \quad \text{Equation (1)}$$

where t is an index in time, $y_i$, i=1, 2, is received signals at receive antenna i, $h_{ij}$, i,j=1, 2, is channel coefficients between receive antenna i and transmit antenna j, $x_j$, j=1, 2, is transmitted signals at transmit antenna j, and $n_i$, i=1, 2, is a noise at receive antenna i. It is assumed that the channel is quasi-static so that the channel coefficients are same during retransmission of the failed packet and the time index on the channel coefficients will be dropped hereinafter.

At a high signal-to-noise ratio (SNR), the SNR for the two data streams after linear minimum mean square error (LMMSE) detection is written as follows:

$$SNR(x_1) = \left(d_1 - \frac{|c|^2}{d_2}\right)\frac{E_s}{N_0}; \quad \text{Equation (2)}$$

and $$SNR(x_2) = \left(d_2 - \frac{|c|^2}{d_1}\right)\frac{E_s}{N_0}; \quad \text{Equation (3)}$$

where $E_s$ is symbol energy, $N_0$ is noise power spectrum density, and $$d_1 = |h_{11}|^2 + |h_{21}|^2; \quad \text{Equation (4)}$$

$$d_2 = |h_{12}|^2 + |h_{22}|^2; \quad \text{and Equation (5)}$$

$$c = h_{11}^* h_{12} + h_{22} h_{21}^*. \quad \text{Equation (6)}$$

An SNR ratio between two data streams is:

$$\frac{SNR(x_1)}{SNR(x_2)} = \frac{d_1}{d_2}. \quad \text{Equation (7)}$$

The SNR ratio in Equation (7) or its variation is used as criteria in assigning a modulation and coding scheme (MCS) for each of the data streams.

For the conventional simple repetitive H-ARQ transmission, the received signal in the retransmission is written as follows:

$$\begin{pmatrix} y_1(t+1) \\ y_2(t+1) \end{pmatrix} = \begin{pmatrix} h_{11} & h_{12} \\ h_{21} & h_{22} \end{pmatrix} \begin{pmatrix} x_1 \\ x_2 \end{pmatrix} + \begin{pmatrix} n_1(t+1) \\ n_2(t+1) \end{pmatrix}. \quad \text{Equation (8)}$$

Combining Equation (1) and Equation (8) results in:

$$\begin{pmatrix} y_1(t) \\ y_2(t) \\ y_1(t+1) \\ y_2(t+1) \end{pmatrix} = \begin{pmatrix} h_{11} & h_{12} \\ h_{21} & h_{22} \\ h_{11} & h_{12} \\ h_{21} & h_{22} \end{pmatrix} \begin{pmatrix} x_1 \\ x_2 \end{pmatrix} + \begin{pmatrix} n_1(t) \\ n_2(t) \\ n_1(t+1) \\ n_2(t+1) \end{pmatrix}. \quad \text{Equation (9)}$$

At a high SNR, the SNRs for the two data streams, after LMMSE detection, are as follows:

$$SNR(x_1) = 2\left(d_1 - \frac{|c|^2}{d_2}\right)\frac{E_s}{N_0}; \quad \text{Equation (10)}$$

and

-continued $$SNR(x_2) = 2\left(d_2 - \frac{|c|^2}{d_1}\right)\frac{E_s}{N_0}. \quad \text{Equation (11)}$$

The SNRs are 3 dB higher than initial transmission. The SNR ratio between the two data streams is the same as the initial transmission.

For the STBC-based H-ARQ, the signal received for the retransmission is written as follows:

$$\begin{pmatrix} y_1(t+1) \\ y_2(t+1) \end{pmatrix} = \begin{pmatrix} h_{11} & h_{12} \\ h_{21} & h_{22} \end{pmatrix}\begin{pmatrix} x_2^* \\ -x_1^* \end{pmatrix} + \begin{pmatrix} n_1(t+1) \\ n_2(t+1) \end{pmatrix}. \quad \text{Equation (12)}$$

Combining Equation (12) and Equation (1) results in:

$$\begin{pmatrix} y_1(t) \\ y_2(t) \\ y_1^*(t+1) \\ y_2^*(t+1) \end{pmatrix} = \begin{pmatrix} h_{11} & h_{12} \\ h_{21} & h_{22} \\ -h_{12}^* & h_{11}^* \\ -h_{22}^* & h_{21}^* \end{pmatrix}\begin{pmatrix} x_1 \\ x_2 \end{pmatrix} + \begin{pmatrix} n_1(t) \\ n_2(t) \\ n_1^*(t+1) \\ n_2^*(t+1) \end{pmatrix}. \quad \text{Equation (13)}$$

At high SNR, the SNRs after LMMSE detector for the two data streams are as follows:

$$SNR(x_1) = SNR(x_2) \approx (d_1 + d_2)\frac{E_s}{N_0}. \quad \text{Equation (14)}$$

Comparing Equations (10), (11) and (14), it can be seen that STBC-based H-ARQ increases the total SNR across the two data streams compared to the simple repetitive H-ARQ when the cross term $|c| \neq 0$, which is generally true for a random MIMO channel.

However, in many practical systems, to achieve the maximum capacity offered by the MIMO channel, a data rate assigned to each spatial data stream is controlled separately according to its own SNR. This scheme is often referred to as per-antenna rate control (PARC). At the initial transmission, the transmitter, (e.g., a Node-B), would allocate a higher modulation and coding scheme (MCS) to the antenna with a higher SNR and allocate a lower MCS to the antenna with a lower SNR. Since the MCS is often kept the same for each antenna when retransmission occurs, it is desirable to keep the same SNR ratio between the antennas after retransmissions. However, the STBC-based H-ARQ scheme equalizes the SNR across all data streams after packet combining as shown in Equation (14). Therefore, the STBC-based H-ARQ scheme is not suitable for systems that adaptively change data rate per spatial stream, (e.g., PARC).

SUMMARY

The present invention is related to a method and apparatus for implementing H-ARQ in a MIMO wireless communication system. A transmitter transmits at least two data packets via two or more antennas. If at least one of the data packets is not successfully transmitted, the transmitter retransmits the data packets while rearranging the data packets in an orthogonal spreading manner. Alternatively, the transmitter may retransmit only the unsuccessfully transmitted data packet along with a new data packet while replacing a successfully transmitted data packet. The unsuccessfully transmitted data packet may simply be repeated without changing its format. When only the unsuccessfully transmitted data packet is retransmitted along with the new data packet, the transmissions may be combined to recover the retransmitted data packet and the new data packet simultaneously.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

The present invention may be implemented in any type of wireless communication systems including, but not limited to, wideband code division multiple access (WCDMA), frequency division duplex (FDD), time division duplex (TDD), long term evolution (LTE) of the third generation (3G) system, orthogonal frequency division multiplexing (OFDM), or any other wireless communication system.

Figure 1:
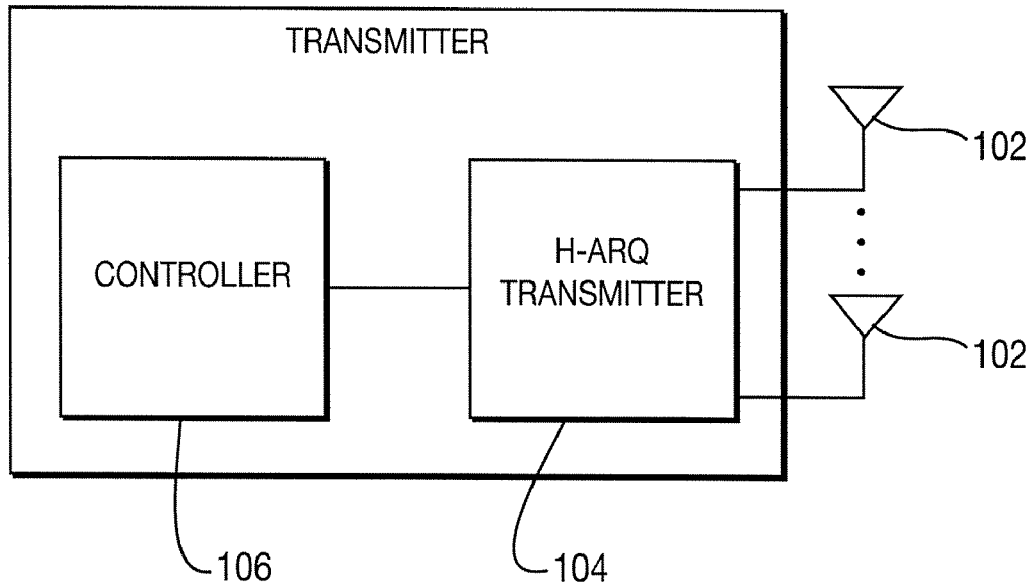
FIG. 1 is a block diagram of a transmitter configured in accordance with the present invention.
Figure 2:
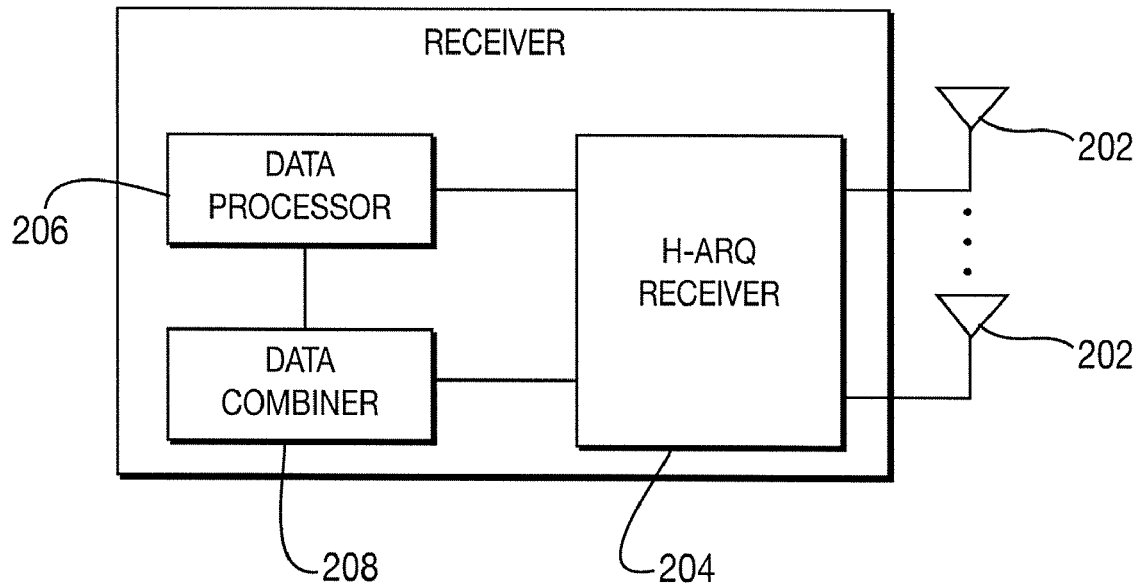
FIG. 2 is a block diagram of a receiver configured in accordance with the present invention.

FIGS. 1 and 2 are block diagrams of a transmitter 100 and a receiver 200 configured in accordance with the present invention. The transmitter 100 and the receiver 200 may be a wireless transmit/receive unit (WTRU) or a base station. The terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. The terminology "base station" includes but is not limited to a Node-B, a site controller, an access point (AP), or any other type of interfacing device capable of operating in a wireless environment.

The transmitter 100 includes at least two antennas 102, an H-ARQ transmitter 104 and a controller 106. The H-ARQ transmitter 104 transmits at least two data packets simultaneously via the antennas 102 by implementing an H-ARQ mechanism. The H-ARQ transmitter 104 retransmits data packets if at least one of the data packets is not successfully transmitted. The controller 106 arranges data packets for retransmission in accordance with an orthogonal spreading H-ARQ scheme, a modified repetitive H-ARQ scheme or a modified STBC-based H-ARQ scheme in accordance with the present invention, which will be explained in detail hereinafter.

The receiver 200 includes at least two antennas 202, an H-ARQ receiver 204 and a data processor 206. The receiver 200 may optionally include a data combiner 208. Data transmitted by the transmitter 100 is received by the antennas 202. The H-ARQ receiver 204 receives the data by implementing an H-ARQ mechanism. The data processor 206 recovers data packets transmitted by the transmitter 100. If the transmitter 100 retransmits an unsuccessfully transmitted data packet along with a new data packet which replaces a successfully transmitted data packet when at least one data packet is not successfully delivered to the receiver 200 at an initial transmission, the data combiner 208 may combine retransmitted data and the initially received data after subtracting the successfully received data packet from the initially received data. The data processor 206 then simultaneously processes the unsuccessfully transmitted data packet and the new data packet that are transmitted together in retransmission. The transmit and receive processing will be explained in detail hereinafter.

An orthogonal spreading-based H-ARQ scheme in accordance with the present invention is explained. Table 3 shows signal transmissions in accordance with the orthogonal spreading-based H-ARQ scheme of the present invention for an exemplary 2×2 MIMO system. It should be noted that the 2×2 MIMO system is provided as an example, not as a limitation, and the present invention may be applied to a system employing more than two (2) antennas.

TABLE 3

|  | Antenna 1 | Antenna 2 |
| --- | --- | --- |
| first transmission | $x_1$ | $x_2$ |
| second transmission | $x_1$ | $-x_2$ |

A received signal for the retransmitted packet is written as follows:

$$\begin{pmatrix} y_1(t+1) \\ y_2(t+1) \end{pmatrix} = \begin{pmatrix} h_{11} & h_{12} \\ h_{21} & h_{22} \end{pmatrix} \begin{pmatrix} x_1 \\ -x_2 \end{pmatrix} + \begin{pmatrix} n_1(t+1) \\ n_2(t+1) \end{pmatrix}.$$

Equation (15)

Combining Equation (15) and Equation (1) results in:

$$\begin{pmatrix} y_1(t) \\ y_2(t) \\ y_1(t+1) \\ y_2(t+1) \end{pmatrix} = \begin{pmatrix} h_{11} & h_{12} \\ h_{21} & h_{22} \\ h_{11} & -h_{12} \\ h_{21} & -h_{22} \end{pmatrix} \begin{pmatrix} x_1 \\ x_2 \end{pmatrix} + \begin{pmatrix} n_1(t) \\ n_2(t) \\ n_1(t+1) \\ n_2(t+1) \end{pmatrix}.$$

Equation (16)

An LMMSE receiver to estimate $x_1$ and $x_2$ from Equation (16) is as follows:

$$\begin{pmatrix} \hat{x}_1 \\ \hat{x}_2 \end{pmatrix} = \left( \overline{H}^H \overline{H} + \frac{N_0}{E_s} I \right)^{-1} \overline{H}^H \begin{pmatrix} y_1(t) \\ y_2(t) \\ y_1(t+1) \\ y_2(t+1) \end{pmatrix};$$

Equation (17)

where $$\overline{H} = \begin{pmatrix} h_{11} & h_{12} \\ h_{21} & h_{22} \\ h_{11} & -h_{12} \\ h_{21} & -h_{22} \end{pmatrix}.$$

At a high SNR, the post-MMSE SNR for the two data streams are as follows:

$$SNR(x_1) = 2d_1 \frac{E_s}{N_0};$$

Equation (18)

and $$SNR(x_2) = 2d_2 \frac{E_s}{N_0}.$$

Equation (19)

The total SNR across all data streams is increased compared to the conventional simple repetitive H-ARQ scheme. The SNR after retransmission is shown in Equations (18) and (19). The SNR ratio between the two data streams is the same as the initial transmission, which is a desired feature for PARC-enabled MIMO systems.

The orthogonal spreading-based H-ARQ scheme can be easily extended to more than two antenna systems. Assuming a symbol vector to be transmitted over N antennas is $X_0=(x_1, x_2, \ldots x_N)$. The orthogonal spreading-based H-ARQ transmission pattern is determined by:

$$X=\sqrt{N}\text{Diag}(X_0)U_N;$$

Equation (20)

where $U_N$ is an N×N unitary matrix. The n-th column of the matrix X is transmitted during the n-th transmission. Table 4 shows signal transmissions in accordance with the present invention for an exemplary 4×4 MIMO system.

TABLE 4

|  | Antenna 1 | Antenna 2 | Antenna 3 | Antenna 4 |
| --- | --- | --- | --- | --- |
| first transmission | $x_1$ | $x_2$ | $x_3$ | $x_4$ |
| second transmission | $x_1$ | $-x_2$ | $x_3$ | $-x_4$ |
| third transmission | $x_1$ | $x_2$ | $-x_3$ | $-x_4$ |
| fourth transmission | $x_1$ | $-x_2$ | $-x_3$ | $x_4$ |

In accordance with another embodiment of the present invention, when one of the transmitted data packets is not successfully received, only the failed data packet is retransmitted along with a new data packet. The new data packet replaces the successfully transmitted data packet. For example, in a 2×2 MIMO system, data packets $x_1$ and $x_2$ are transmitted via two antennas, and data packet $x_1$ is successfully received, but data packet $x_2$ is not. In conventional systems, both packets $x_1$ and $x_2$ are retransmitted subsequently. In accordance with the present invention, only the failed packet $x_2$ is retransmitted and the successfully transmitted packet $x_1$ is not transmitted. Instead, a new data packet $x_3$ is transmitted along with the failed packet $x_2$.

Table 5 shows signal transmissions in accordance with the present invention and a conventional STBC-based H-ARQ scheme for an exemplary 2×2 MIMO system. In the conventional STBC-based H-ARQ, both packets $x_1$ and $x_2$ are retransmitted in different formats as shown in Table 5. In accordance with the present invention, a new data packet $x_3$ replaces the successfully received packet $x_1$ of the conventional STBC-based H-ARQ system, and the failed data packet $x_2$ and the new data packet $x_3$ are transmitted as in STBC-based H-ARQ scheme as shown in Table 5. It is assumed that no PARC type of rate adaptation is used in this case. To simplify receiver design, the format of the new packet $x_3$ may be identical to the data packet $x_1$ in the second transmission, (i.e., conjugated and inversed). Alternatively, the format for the new data packet $x_3$ may be different from data packet $x_1$.

TABLE 5

|  | Antenna 1 | Antenna 2 |
| --- | --- | --- |
| first Transmission | $x_1$ (success) | $x_2$ (fail) |
| second transmission (conventional STBC-based H-ARQ) | $x_2$* | $-x_1$* |
| second transmission (present invention) | $x_2$* | $-x_3$* |

At the receiver, since data packet $x_1$ is received successfully, the decoded bits of data packet $x_1$ are reconstructed and subtracted from received data for the first transmission. The modified received data is then combined with the received data for the second transmission. Spatial diversity is achieved in the retransmitted data packet, (i.e., data packet $x_2$). This arrangement improves an SNR of new data packet $x_3$ which will be explained hereinafter.

The received signal of the first transmission is as in Equation (1). After subtracting the successfully received data packet $x_1$ from the received data, it becomes as follows:

$$\begin{pmatrix} \tilde{y}_1(t) \\ \tilde{y}_2(t) \end{pmatrix} = \begin{pmatrix} y_1(t) \\ y_2(t) \end{pmatrix} - \begin{pmatrix} h_{11}(t) \\ h_{21}(t) \end{pmatrix} x_1 \qquad \text{Equation (21)}$$

$$= \begin{pmatrix} 0 & h_{12}(t) \\ 0 & h_{22}(t) \end{pmatrix} \begin{pmatrix} x_3 \\ x_2 \end{pmatrix} + \begin{pmatrix} n_1(t) \\ n_2(t) \end{pmatrix}.$$

Packet $x_3$ is added into Equation (21) to facilitate description hereafter.

The received signal for the second transmission is written as follows:

$$\begin{pmatrix} y_1(t+1) \\ y_2(t+1) \end{pmatrix} = \begin{pmatrix} h_{11}(t+1) & h_{12}(t+1) \\ h_{21}(t+1) & h_{22}(t+1) \end{pmatrix} \begin{pmatrix} x_2^* \\ -x_3^* \end{pmatrix} + \begin{pmatrix} n_1(t+1) \\ n_2(t+1) \end{pmatrix}. \qquad \text{Equation (22)}$$

Combining Equations (21) and (22) results in:

$$\begin{pmatrix} \tilde{y}_1(t) \\ \tilde{y}_2(t) \\ y_1^*(t+1) \\ y_2^*(t+1) \end{pmatrix} = \begin{pmatrix} h_{12}(t) & 0 \\ h_{22}(t) & 0 \\ -h_{12}^*(t+1) & h_{11}^*(t+1) \\ -h_{22}^*(t+1) & h_{21}^*(t+1) \end{pmatrix} \begin{pmatrix} x_2 \\ x_3 \end{pmatrix} + N. \qquad \text{Equation (23)}$$

Equation (23) converts two 2×2 system into a virtual 2×4 system. Conventional LMMSE may be applied to demodulate packets $x_2$ and $x_3$ as follows:

$$\begin{pmatrix} \hat{x}_2 \\ \hat{x}_3 \end{pmatrix} = \left(\overline{H}^H \overline{H} + \frac{N_0}{E_s} I\right)^{-1} \overline{H}^H \begin{pmatrix} \tilde{y}_1(t) \\ \tilde{y}_2(t) \\ y_1^*(t+1) \\ y_2^*(t+1) \end{pmatrix}, \qquad \text{Equation (24)}$$

where $$\overline{H} = \begin{pmatrix} h_{12}(t) & 0 \\ h_{22}(t) & 0 \\ -h_{12}^*(t+1) & h_{11}^*(t+1) \\ -h_{22}^*(t+1) & h_{21}^*(t+1) \end{pmatrix}.$$

In quasi-static channel, spatial diversity is achieved on retransmitted data packet $x_2$ with reduced interference due to zero elements in the matrix above. Assuming quasi-static channel and dropping time index t, at high SNR, the SNRs of the data streams for the second transmission are written as follows:

$$SNR(x_2) \approx \left(d_1 - \frac{|c|^2}{d_2}\right) \frac{E_s}{N_0}; \text{ and} \qquad \text{Equation (25)}$$

$$SNR(x_3) \approx \left(d_2 - \frac{|c|^2}{d_1}\right) \frac{E_s}{N_0}; \qquad \text{Equation (26)}$$

where $d_1 = |h_{11}|^2 + |h_{12}|^2 + |h_{21}|^2 + |h_{22}|^2$, $d_2 = |h_{12}|^2 + |h_{22}|^2$, and $c = -h_{11} h_{12}^* - h_{21} h_{22}^*$.

With respect to new data packet $x_3$, a conventional detection technique may be used, where packet $x_2$ is detected independently from two transmissions followed by a maximum ratio combining (MRC), and packet $x_3$ is detected only using the second transmission. In other words, conventional technique solves Equations (21) and (22) separately, then perform combining. In Equation (21), since all effective channel coefficients corresponding to $x_3$ equal to zero (0), only information on $x_2$ can be derived from Equation (21). With this detection technique, the SNRs are as follows:

$$SNR(x_2) \approx \left(d_1 - \frac{|c|^2}{d_2}\right) \frac{E_s}{N_0}; \text{ and} \qquad \text{Equation (27)}$$

$$SNR(x_3) \approx \left(d_2 - \frac{|c|^2}{d_1'}\right) \frac{E_s}{N_0}; \qquad \text{Equation (28)}$$

where $d_1' = |h_{11}|^2 + |h_{21}|^2$. The SNR of packet $x_2$ is identical in both techniques. However, a better SNR on $x_3$ is achieved in accordance with the present invention, when comparing Equations (26) and (28), and considering $d_1 > d_1'$.

The present invention may be extended to systems with more than two antennas. Tables 6 and 7 show examples of extension to a four antenna system. Table 6 shows conventional STBC-based H-ARQ scheme and Table 7 shows an STBD-based H-ARQ scheme with the successfully transmitted packet being replaced with a new packet in accordance with the present invention.

TABLE 6

|  | Antenna 1 | Antenna 2 | Antenna 3 | Antenna 4 |
|---|---|---|---|---|
| Time 1 | $x_1$ | $x_2$ | $x_3$ | $x_4$ |
| Time 2 | $-x_2^*$ | $x_1^*$ | $-x_4^*$ | $x_3^*$ |
| Time 3 | $-x_3^*$ | $-x_4^*$ | $x_1^*$ | $x_2^*$ |
| Time 4 | $x_4$ | $-x_3$ | $-x_2$ | $x_1$ |

TABLE 7

|  | Antenna 1 | Antenna 2 | Antenna 3 | Antenna 4 |
|---|---|---|---|---|
| Time 1 | $x_1$ (fail) | $x_2$ (fail) | $x_3$ | $x_4$ (fail) |
| Time 2 | $-x_2^*$ | $x_1^*$ (fail) | $-x_4^*$ (fail) | $x_5^*$ (fail) |
| Time 3 | $-x_5^*$ | $-x_4^*$ | $x_1^*$ | $x_6^*$ (fail) |
| Time 4 | $x_7$ | $-x_8$ | $-x_6$ | $x_9$ |

Alternatively, the failed packet $x_2$ may be simply repeated and a new packet $x_3$ is transmitted along with the packet $x_2$ simultaneously. Table 8 shows signal transmissions in accordance with the present invention and a conventional simple repetitive H-ARQ scheme for an exemplary 2×2 MIMO system. In the conventional simple repetitive H-ARQ scheme, the spatial stream that is successfully received is left blank for retransmission. In accordance with the present invention, a new data packet $X_3$ is transmitted in place of the blank packet. Therefore, higher spectral efficiency is achieved.

TABLE 8

|  | Antenna 1 | Antenna 2 |
|---|---|---|
| first Transmission | $x_1$ (success) | $x_2$ (fail) |
| second transmission (conventional simple repetitive H-ARQ) | 0 | $x_2$ |
| second transmission (Present invention) | $x_3$ | $x_2$ |

The received signal of the first transmission is as in Equation (1). After subtracting data bits of the successfully received data packet $x_1$ from the initially received data, it becomes as follows:

$$\begin{pmatrix} \tilde{y}_1(t) \\ \tilde{y}_2(t) \end{pmatrix} = \begin{pmatrix} y_1(t) \\ y_2(t) \end{pmatrix} - \begin{pmatrix} h_{11}(t) \\ h_{21}(t) \end{pmatrix} x_1 \qquad \text{Equation (29)}$$

$$= \begin{pmatrix} 0 & h_{12}(t) \\ 0 & h_{22}(t) \end{pmatrix} \begin{pmatrix} x_3 \\ x_2 \end{pmatrix} + \begin{pmatrix} n_1(t) \\ n_2(t) \end{pmatrix}.$$

The received signal for the second transmission is written as follows:

$$\begin{pmatrix} y_1(t+1) \\ y_2(t+1) \end{pmatrix} = \begin{pmatrix} h_{11}(t+1) & h_{12}(t+1) \\ h_{21}(t+1) & h_{22}(t+1) \end{pmatrix} \begin{pmatrix} x_3 \\ x_2 \end{pmatrix} + \begin{pmatrix} n_1(t+1) \\ n_2(t+1) \end{pmatrix}. \qquad \text{Equation (30)}$$

Combining Equations (29) and (30) results in:

$$\begin{pmatrix} \tilde{y}_1(t) \\ \tilde{y}_2(t) \\ y_1(t+1) \\ y_2(t+1) \end{pmatrix} = \begin{pmatrix} h_{12}(t) & 0 \\ h_{22}(t) & 0 \\ h_{12}(t+1) & h_{11}(t+1) \\ h_{22}(t+1) & h_{21}(t+1) \end{pmatrix} \begin{pmatrix} x_2 \\ x_3 \end{pmatrix} + N. \qquad \text{Equation (31)}$$

Instead of solving Equations (29) and (30) followed by a combiner, the present invention applies LMMSE to solve Equation (31) as follows:

$$\begin{pmatrix} \hat{x}_2 \\ \hat{x}_3 \end{pmatrix} = \left( \overline{H}^H \overline{H} + \frac{N_0}{E_s} I \right)^{-1} \overline{H}^H \begin{pmatrix} \tilde{y}_1(t) \\ \tilde{y}_2(t) \\ y_1(t+1) \\ y_2(t+1) \end{pmatrix}; \qquad \text{Equation (32)}$$

where $$\overline{H} = \begin{pmatrix} h_{12}(t) & 0 \\ h_{22}(t) & 0 \\ h_{12}(t+1) & h_{11}(t+1) \\ h_{22}(t+1) & h_{21}(t+1) \end{pmatrix}.$$

At high SNR, the post-MMSE SNRs for $x_2$ and $x_3$ are as follows:

$$SNR(x_2) \approx \left( d_1 - \frac{|c|^2}{d_2} \right) \frac{E_s}{N_0}; \text{ and} \qquad \text{Equation (33)}$$

$$SNR(x_3) \approx \left( d_2 - \frac{|c|^2}{d_1} \right) \frac{E_s}{N_0}; \qquad \text{Equation (34)}$$

where $d_1 = 2(|h_{12}|^2 + |h_{22}|^2)$, $d_2 = |h_{11}|^2 + |h_{21}|^2$, and $c = h_{11}h_{12}^* + h_{21}h_{22}^*$.

For a conventional receiver, data is detected separately for each transmission before being combined. In other words, conventional detection solves Equations (29) and (30) separately, then combine post detected signal. Assuming LMMSE receiver is used to solve Equation (31), and a maximal ratio combining (MRC) is used to combine post-detection signal, the combined SNR for data $x_2$ and $x_3$ at high SNR can be written as:

$$SNR(x_2) \approx \left( d_1 - \frac{|c|^2}{d_2} \right) \frac{E_s}{N_0}; \text{ and} \qquad \text{Equation (35)}$$

$$SNR(x_3) \approx \left( d_2 - \frac{|c|^2}{d_1'} \right) \frac{E_s}{N_0}; \qquad \text{Equation (36)}$$

where $d_1' = (|h_{12}|^2 + |h_{22}|^2)$, $d_2 = |h_{11}|^2 + |h_{21}|^2$, and $c = h_{11}h_{12}^* + h_{21}h_{22}^*$.

By comparing Equations (33) and (35), it is shown that the SNR of the retransmitted data packet $x_2$ is identical for both the conventional scheme and the present invention. However, by comparing Equations (34) and (36), it is shown that the SNR of new data packet $x_3$ is improved using the present invention, since $d_1 > d_1'$.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of implementing hybrid automatic repeat request (H-ARQ) for use in a receiver comprising:
   receiving a first transmission including a first data packet and a second data packet;
   transmitting a H-ARQ feedback signal indicating the first data packet was successfully received and the second data packet was not successfully received;
   receiving a second transmission including the second data packet along with a third data packet in place of the first data packet; and reconstructing the second data packet and the third data packet, wherein the reconstructing includes:
subtracting the received first data packet from the received first transmission to generate a first modified received data, and
performing minimum mean square error (MMSE) detection on a combination of the first modified received data and the received second transmission.

2. The method of claim 1, wherein the first transmission is received via a plurality of antennas.

3. The method of claim 2, wherein the plurality of antennas comprises a first antenna and a second antenna.

4. The method of claim 3, wherein the combination of the first modified received data and the received second transmission forms a virtual 2×4 system.

5. The method of claim 1, wherein the first transmission is transmitted via a plurality of antennas.

6. The method of claim 5, wherein the first data packet is transmitted via a first antenna and the second data packet is transmitted via a second antenna.

7. The method of claim 6, wherein the second data packet is retransmitted via the first antenna and the third data packet is transmitted via the second antenna.

8. The method of claim 1, wherein the performing MMSE detection further comprises performing linear MMSE (LMMSE).

9. A receiver configured to implement hybrid automatic repeat request (H-ARQ), the receiver comprising:
a transceiver configured to:
receive a first transmission including a first data packet and a second data packet;
transmit a H-ARQ feedback signal indicating the first data packet was successfully received and the second data packet was not successfully received;
receive a second transmission including the second data packet along with a third data packet in place of the first data packet; and
a processor configured to reconstruct the second data packet and the third data packet, the processor further configured to:
subtract the received first data packet from the received first transmission to generate a first modified received data, and
perform minimum mean square error (MMSE) detection on a combination of the first modified received data and the received second transmission.

10. The receiver of claim 9, wherein the first transmission is received via a plurality of antennas.

11. The receiver of claim 10, wherein the plurality of antennas comprises a first antenna and a second antenna.

12. The receiver of claim 11, wherein the combination of the first modified received data and the received second transmission forms a virtual 2×4 system.

13. The receiver of claim 9, wherein the first transmission is transmitted via a plurality of antennas.

14. The receiver of claim 13, wherein the first data packet is transmitted via a first antenna and the second data packet is transmitted via a second antenna.

15. The receiver of claim 14, wherein the second data packet is retransmitted via the first antenna and the third data packet is transmitted via the second antenna.

16. The receiver of claim 9, wherein the performing MMSE detection further comprises performing linear MMSE (LMMSE).

* * * * *